(12) United States Patent
Kray et al.

(10) Patent No.: US 12,618,416 B1
(45) Date of Patent: May 5, 2026

(54) TRUNNIONS HAVING MULTIPLE FAN BLADES FOR USE WITH AN AIRCRAFT ENGINE

(71) Applicant: General Electric Company, Evendale, OH (US)

(72) Inventors: Nicholas Joseph Kray, Mason, OH (US); Syed Arif Khalid, West Chester, OH (US); Arthur W. Sibbach, Boxford, MA (US)

( * ) Notice: Subject to any disclaimer, the term of this patent is extended or adjusted under 35 U.S.C. 154(b) by 0 days.

(21) Appl. No.: 19/224,363

(22) Filed: May 30, 2025

(51) Int. Cl.
| | |
|---|---|
| *F04D 29/36* | (2006.01) |
| *F02K 3/06* | (2006.01) |
| *F04D 19/00* | (2006.01) |
| *F04D 29/38* | (2006.01) |

(52) U.S. Cl.
CPC .............. *F04D 29/362* (2013.01); *F02K 3/06* (2013.01); *F04D 19/002* (2013.01); *F04D 29/388* (2013.01); *F05D 2220/323* (2013.01); *F05D 2220/36* (2013.01); *F05D 2240/301* (2013.01)

(58) Field of Classification Search
CPC .... F04D 29/362; F04D 19/002; F04D 29/388; F02K 3/06; F05D 2220/323; F05D 2220/36; F05D 2240/301
See application file for complete search history.

(56) References Cited

U.S. PATENT DOCUMENTS

| | | | | |
|---|---|---|---|---|
| 3,193,185 | A * | 7/1965 | Erwin | F04D 29/324 |
| | | | | 415/199.5 |
| 4,512,718 | A * | 4/1985 | Stargardter | F04D 29/324 |
| | | | | 415/181 |
| 8,303,258 | B2 | 11/2012 | Aubin | |
| 9,381,997 | B2 | 7/2016 | Perkinson | |
| 9,938,984 | B2 | 4/2018 | DiPietro, Jr. et al. | |
| 10,221,706 | B2 | 3/2019 | Niergarth et al. | |
| 10,543,901 | B2 | 1/2020 | Miskiewicz et al. | |
| 11,401,824 | B2 * | 8/2022 | Breeze-Stringfellow | |
| | | | | F02K 5/00 |
| 11,407,494 | B2 | 8/2022 | Carrington | |
| 12,055,153 | B1 * | 8/2024 | Chakrabarti | F04D 29/668 |
| 2017/0114796 | A1 * | 4/2017 | DiPietro, Jr. | F01D 5/146 |
| 2018/0335051 | A1 * | 11/2018 | Lurie | F04D 29/542 |
| 2021/0180458 | A1 * | 6/2021 | DiPietro, Jr. | F01D 5/142 |
| 2021/0222575 | A1 * | 7/2021 | Breeze-Stringfellow | |
| | | | | F01D 25/12 |
| 2024/0044253 | A1 * | 2/2024 | Kray | F02K 3/06 |
| 2024/0051656 | A1 | 2/2024 | Zutshi et al. | |
| 2024/0328431 | A1 * | 10/2024 | Kray | F02K 3/06 |
| 2024/0360768 | A1 * | 10/2024 | Kray | F01D 25/005 |

FOREIGN PATENT DOCUMENTS

| | | |
|---|---|---|
| EP | 3819208 A1 | 5/2021 |
| GB | 1514096 A | 6/1978 |

* cited by examiner

*Primary Examiner* — Aaron R Eastman
(74) *Attorney, Agent, or Firm* — Hanley, Flight & Zimmerman, LLC

(57) ABSTRACT
Trunnions having multiple fan blades for use with an aircraft engine are disclosed herein. An example comprises a trunnion rotatable within a hub of an aircraft engine, a first fan blade coupled to the trunnion, the first fan blade having a pitch axis, and a second fan blade coupled to the trunnion, the second fan blade having a longitudinal axis, the longitudinal axis laterally offset from the pitch axis.

17 Claims, 5 Drawing Sheets

200

204

204

206

206

202

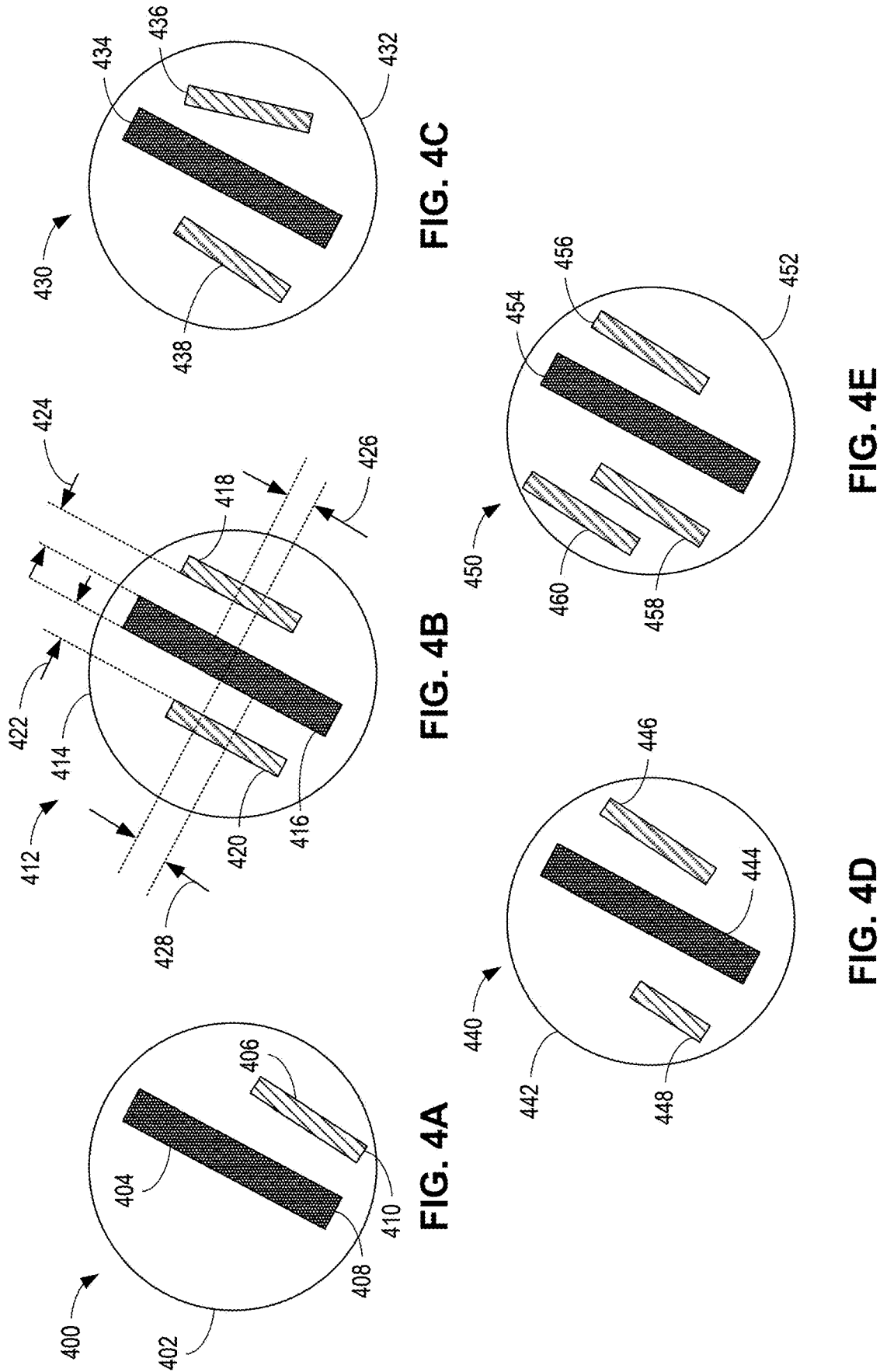

TRUNNIONS HAVING MULTIPLE FAN BLADES FOR USE WITH AN AIRCRAFT ENGINE

FIELD OF THE DISCLOSURE

This disclosure relates generally to fan blades and, more particularly, to trunnions having multiple fan blades for use with an aircraft engine.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

BRIEF DESCRIPTION OF THE DRAWINGS

FIG. 4A is a schematic, plan view of an example first assembly constructed in accordance with teachings disclosed herein.

FIG. 4B is a schematic, plan view of an example second assembly constructed in accordance with teachings disclosed herein.

FIG. 4C is a schematic, plan view of an example third assembly constructed in accordance with teachings disclosed herein.

FIG. 4D is a schematic, plan view of an example fourth assembly constructed in accordance with teachings disclosed herein.

FIG. 4E is a schematic, plan view of an example fifth assembly constructed in accordance with teachings disclosed herein.

Figure 1A:
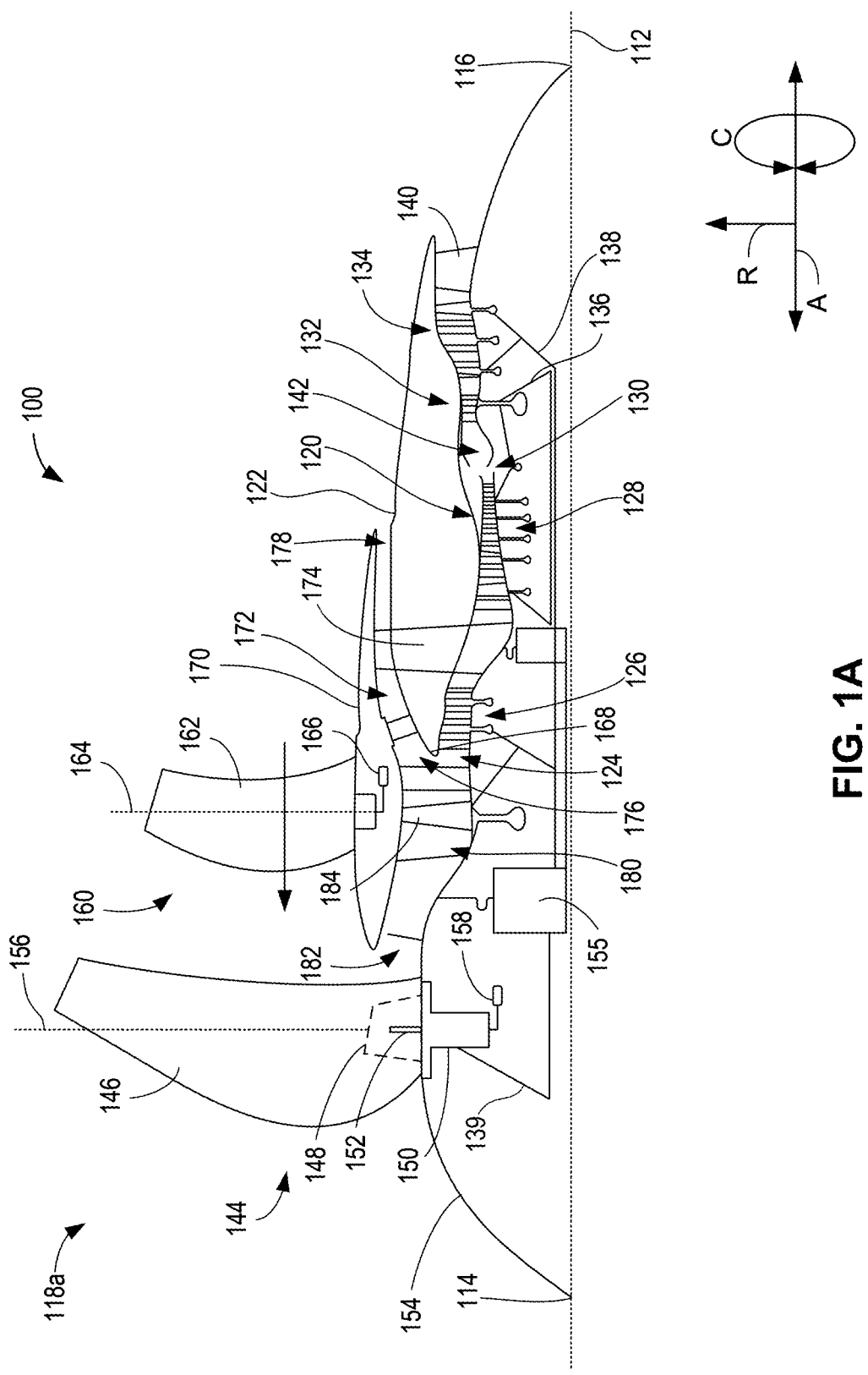
FIG. 1A is a schematic cross-sectional view of an example gas turbine engine in which the presently disclosed technology can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is, therefore, provided to describe example implementations and not to be taken limiting on the scope of the subject matter described in this disclosure. Certain features from different aspects of the following description may be combined to form yet new aspects of the subject matter discussed below.

Aspects of this disclosure generally relate to a rotor (e.g., a rotor assembly) having rotor blades, which are full span (e.g., radial length or height) blades, and splitter blades, which are partial span blades. For purposes of illustration, the present disclosure will be described with respect to a fan section of an open-rotor gas turbine engine. It will be understood, however, that aspects of the disclosure described herein are not so limited and may have applicability for other rotors in an engine, including compressor rotors, in other types of engines (e.g., ducted engines, turboprop engines, etc.) as well as in non-aircraft applications, such as other mobile applications and non-mobile industrial, commercial, and residential applications.

The fan section disclosed herein includes an array of fan blades arranged circumferentially around a rotor. The fan blades are full span blades that at least partially define a diameter of a fan. The fan section disclosed herein includes splitter blades positioned circumferentially between the fan blades. The splitter blades include a partial span that is less than the full span of the fan blades.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by (e.g., the same entity or object). Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

The terms "upstream" and "downstream" refer to the relative direction with respect to fluid flow in a fluid pathway. For example, "upstream" refers to the direction from which the fluid flows, and "downstream" refers to the direction to which the fluid flows. For example, with regard to a gas turbine engine, an engine inlet is said to be upstream of an engine outlet, and the engine outlet is said to be downstream of the engine inlet.

The terms "forward" and "aft" refer to relative positions within a gas turbine engine or vehicle, and refer to the normal operational attitude of the gas turbine engine or vehicle. For example, with regard to a gas turbine engine, forward refers to a position relatively closer to the nose of an aircraft and aft refers to a position relatively closer to a tail of the aircraft.

As used herein, stating that any part (e.g., an area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed or pressure values.

As used herein, an axial direction (denoted "A") is a direction that extends parallel to an axis of rotation about which rotating components of a gas turbine engine rotate and is generally aligned with an engine centerline.

As used herein, a radial direction (denoted "R") is a direction that extends perpendicular to the axis of rotation and points towards (radially inward) or away from (radially outward) the engine centerline.

As used herein, a circumferential direction (denoted "C") is a direction that extends concentrically around the axis of rotation.

The term "splitter blade" as used herein refers to a blade of a gas turbine engine having a partial span. The term "partial span" as used herein refers to a span that is shorter than a full span of a corresponding rotor blade (e.g., a fan blade, a compressor blade and/or rotatable blade). More specifically, depending on a particular use case, the partial span is at least three percent of the full span and less than or equal to 50 percent of the full span. As discussed in further detail below, a particular partial span of a splitter blade is at least partially based on a particular corresponding full-span blade rotor blade.

The term "blade" as used herein refers to a blade of a rotor assembly. For example, a blade can include a fan blade, a splitter blade, a compressor blade, and/or another rotatable blade. A blade, also referred to herein as an airfoil, generally includes a leading edge, a trailing edge, a tip, a root, and a span extending from root to tip. The term "leading edge" (LE) as used herein refers to a forward edge of an airfoil. The term "trailing edge" (TE) as used herein refers to an aft edge of an airfoil. The term "tip" refers to a radially outermost surface of an airfoil.

The term "span" (also referred to herein as "radial length" and "radial height") as it relates to a blade refers to a distance measured in the radial direction between a root of the blade and a tip of the blade.

The term "chord length" refers to a dimension of an airfoil perpendicular to the radial direction and is a straight-line measurement from a leading edge of the airfoil to a trailing edge of the airfoil.

As used herein, the word "exemplary" means "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

A turbine engine, also referred to herein as a gas turbine engine, is a type of internal combustion engine that uses air as a moving fluid. The turbine engine generally includes a fan and a turbomachine having core or core turbine engine. As used herein, a "core" or "core turbine engine" refers to a combination of a high pressure compressor, a combustor, and a high pressure turbine coupled through a high pressure shaft. In some examples, the fan is coupled to the core via a gearbox. In some examples, the turbomachine can further include a low pressure turbine coupled with the fan via a low pressure shaft through a gearbox.

In operation, atmospheric air enters the gas turbine engine via the fan. A first portion of the air bypasses the core turbine engine to produce thrust. A second portion of the air enters the core turbine engine, which is operable to generate a flow of hot, pressurized, combustion gases to operate the gas turbine engine as well as to perform useful work, such as providing propulsive thrust or mechanical work. The fan is tasked with moving amounts of atmospheric air to produce (e.g., high) levels of thrust for operation of an aircraft.

Referring now to the drawings, wherein identical numerals indicate the same elements throughout the figures, FIG. 1A is a schematic cross-sectional view of an example open-rotor-type gas turbine engine. Particularly, FIG. 1A illustrates an aviation three-stream turbine engine ("turbine engine 100"). As a non-limiting example, the turbine engine 100 of FIG. 1A can be mounted to an aircraft to produce thrust for propulsion of the aircraft. The architecture of the turbine engine 100 of FIG. 1A provides three distinct streams of thrust-producing airflow during operation. The turbine engine 100 includes a fan that is not ducted by a nacelle or cowl, such that it may be referred to herein as an "unducted fan," or the entire turbine engine 100 may be referred to as an "unducted engine" or an "open-rotor engine".

As shown in FIG. 1A, the turbine engine 100 defines an engine centerline 112 (e.g., a longitudinal or axial centerline axis) extending therethrough for reference. FIG. 1A also includes a cartesian coordinate system illustrating an axial direction A, a radial direction R, and a circumferential direction C. The axial direction A extends axially in a direction extending between forward and aft, which can be arranged along the engine centerline 112. The radial direction R extends orthogonally relative to the engine centerline 112. The circumferential direction C extends perpendicular to the radial direction R, and circumscribes the engine centerline 112. The turbine engine 100 extends between a forward end 114 and an aft end 116 (e.g., along the axial direction A).

The turbine engine 100 includes a core turbine or gas turbine engine ("core turbine engine 120") disposed downstream from a fan section 118a. Generally, the core turbine engine 120 includes, in serial flow order, a compressor section, a combustion section, a turbine section, and an exhaust section. Particularly, as shown in FIG. 1A, the core turbine engine 120 includes a core cowl 122 that defines an annular core inlet 124. The core cowl 122 further encloses a low pressure system and a high pressure system. In certain examples, the core cowl 122 may enclose and support a booster or low pressure ("LP") compressor 126 for pressurizing the air that enters the core turbine engine 120 through the core inlet 124. A high pressure ("HP"), multi-stage, axial-flow compressor 128 receives pressurized air from the LP compressor 126 and further increases the pressure of the air. The pressurized air stream flows downstream to a combustor 130 where fuel is injected into the pressurized air stream and ignited to raise the temperature and energy level of the pressurized air.

The high energy combustion products flow from the combustor 130 downstream to a high pressure turbine 132 ("HP turbine 132"). The HP turbine 132 drives the HP compressor 128 through a high pressure shaft 136 ("HP turbine 136"). In this regard, the HP turbine 132 is drivingly coupled with the HP compressor 128. The high energy combustion products then flow to a low pressure turbine 134 ("LP turbine 134"). The LP turbine 134 drives the LP compressor 126 and components of the fan section 118a through a low pressure shaft 138 ("LP shaft 138"). In this regard, the LP turbine 134 is drivingly coupled with the LP compressor 126 and components of the fan section 118a. The LP shaft 138 is coaxial with the HP shaft 136 in this example. After driving each of the turbines 132, 134, the combustion products exit the core turbine engine 120 through a core exhaust nozzle 140 to produce propulsive thrust. Accordingly, the core turbine engine 120 defines a core flow path or core duct 142 that extends between the core inlet 124 and the core exhaust nozzle 140. The core duct 142 is an annular duct positioned generally inward of the core cowl 122 along the radial direction. The core duct 142 (e.g., the working gas flowpath through the core turbine engine 120) may be understood as forming at least a portion of a second stream of the turbine engine 100 (e.g., a thrust generated by an airflow through the core duct 142 exiting through the core exhaust nozzle 140).

The fan section 118a includes a fan 144, which is a primary fan in this example. For the depicted example of FIG. 1A, the fan 144 is an open-rotor or unducted fan. However, in other examples, the fan 144 may be ducted (e.g., by a fan casing or nacelle circumferentially surrounding the fan 144). As depicted, the fan 144 includes an array of fan blades 146 (one shown in FIG. 1A) (e.g., first fan blades, primary fan blades, main fan blades, primary blades, full-span blades, etc.). The fan 144 also includes an array of splitter blades 148 (one shown in FIG. 1A) (e.g., second or secondary blades, partial-span blades etc.) (hereinafter referred to as "splitter blades 148"). The number of fan blade 146 and splitter blades 148 can vary. In some examples, the fan 144 includes at least twelve (12) fan blades 146 and up to 26 fan blades. In some examples, the fan 144 includes at least one (1) splitter blade 148 between each pair of adjacent fan blades 146 and up to four (4) splitter blades 148 between each pair of adjacent fan blades 146.

As discussed in further detail below, the splitter blades 148 are positioned between the fan blades 146 to improve performance of the turbine engine 100. The fan blades 146 and the splitter blades 148 are rotatable (e.g., about the engine centerline). As noted above, the fan 144 is drivingly coupled with the LP turbine 134 via the LP shaft 138. In some examples, the fan 144 can be directly coupled with the LP shaft 138 (e.g., in a direct-drive configuration). In some examples, as shown in FIG. 1A, the fan 144 can be coupled with the LP shaft 138 via a speed reduction gearbox 155 (e.g., in an indirect-drive or geared-drive configuration) (also referred to herein as a gearbox assembly). For example, the fan 144 can be rotatable via a fan shaft 139 that is powered by the LP shaft 138 across the speed reduction gearbox 155, which includes gears for adjusting the rotational speed of the fan shaft 139 relative to the LP shaft 138.

Each blade 146, 148 has a root, a tip, and a span defined therebetween. Each of the blades 146, 148 are coupled at their respective roots to trunnions 150 (one shown in FIG. 1A). The trunnions 150 facilitate attachment and movement of the blades 146, 148 with respect to a disk or housing. In particular, the fan blades 146 and the splitter blades 148 are coupled to the trunnions 150 via respective spars 152 (one shown in FIG. 1A). The spars 152 are coupled to the respective blades 146, 148 within the interiors of the blades 146, 148. In other examples, the fan blades 146 and/or the splitter blades 148 can be coupled to the trunnion 150 via dovetail slots. In other examples, the fan blades 146 and/or the splitter blades 148 can be integrally formed with the trunnion 150. The trunnions 150 are covered by a hub 154 (e.g., a spinner) that is aerodynamically contoured to promote airflow through the blades 146, 148. Moreover, the trunnions 150 are rotatably mounted within the hub 154. The blades 146, 148 extend radially away from the hub 154. Each fan blade 146, being attached to the corresponding trunnion 150 by the root, is rotatable about a respective central blade axis 156 (e.g., in unison with one another). This rotation can be used to control the pitch of the fan blades 146. One or more actuators 158 can be controlled to pitch the fan blades 146 about their respective central blade axis 156 (e.g., via the trunnions 150).

In another embodiment, the trunnions 150 can be omitted. For example, the blades 146, 148 can be mounted to (or integral to) a disk, also referred to as a bladed disk or blisk, such that the blades 146, 148 are fixed pitch blades rather than variable pitch blades.

The fan section 118*a* further includes a fan outlet guide vane array 160 that includes fan outlet guide vanes 162 (one shown in FIG. 1A) disposed around the engine centerline 112. For this example, the fan outlet guide vanes 162 are not rotatable about the engine centerline 112. Each fan outlet guide vane 162 has a root, a tip, and a span defined therebetween. The fan outlet guide vanes 162 may be unshrouded as shown in FIG. 1A or may be shrouded (e.g., by an annular shroud spaced outward from the tips of the fan outlet guide vanes 162 along the radial direction). Each fan outlet guide vane 162 defines a central blade axis 164. For this example, each fan outlet guide vane 162 of the fan outlet guide vane array 160 is rotatable about its respective central blade axis 164 (e.g., in unison with one another). One or more actuators 166 can be controlled to pitch the fan outlet guide vane 162 about their respective central blade axis 164. However, in other examples, each fan outlet guide vane 162 may be fixed or unable to be pitched about its central blade axis 164. The fan outlet guide vanes 162 are mounted to a fan cowl 170.

As shown in FIG. 1A, in addition to the fan 144, which is unducted, a ducted fan 184 is included aft of the fan 144, such that the turbine engine 100 includes both a ducted fan and an unducted fan that both serve to generate thrust through the movement of air without passage through core turbine engine 120. The ducted fan 184 is shown at about the same axial location as the fan outlet guide vane 162, and radially inward of the fan outlet guide vane 162. Alternatively, the ducted fan 184 may be between the fan outlet guide vane 162 and core duct 142, or be farther forward of the fan outlet guide vane 162. The ducted fan 184 may be driven by the low pressure turbine 134 (e.g., coupled to the low pressure shaft 138), or by any other suitable source of rotation, and may serve as the first stage of booster or may be operated separately.

The fan cowl 170 annularly encases at least a portion of the core cowl 122 and is generally positioned outward of the core cowl 122 along the radial direction. Particularly, a downstream section of the fan cowl 170 extends over a forward portion of the core cowl 122 to define a fan flow path or fan duct 172. The fan duct 172 is an annular duct positioned generally outward of the core duct 142 along the radial direction. In operation, atmospheric air that passes through the fan 144 and bypasses the fan cowl 170 and the core cowl 122 may be understood as forming at least a portion of a first stream of the turbine engine 100 (e.g., a thrust generated by an airflow over the fan cowl 170 and the core cowl 122, generated by the fan 144). As used herein, the term "bypass ratio" refers to a ratio in a gas turbine engine of an amount of airflow that is bypassed around the engine's ducted inlet to an amount of airflow that passes through the engine's ducted inlet. For example, in FIG. 1A, the bypass ratio can refer to an amount of airflow from the fan 144 that flows over the fan cowl 170 to an amount of airflow from the fan 144 that flows through the engine inlet 182.

Incoming air may enter through the fan duct 172 through a fan duct inlet 176 and may exit through a fan exhaust nozzle 178 to produce propulsive thrust. In some examples, the fan flow path or fan duct 172 may be understood as forming at least a portion of a third stream of the turbine engine 100 (e.g., a thrust generated by an airflow through the fan duct 172 exiting through the fan exhaust nozzle 178, generated at least in part by the ducted fan 184).

The fan cowl 170 and the core cowl 122 of FIG. 1A are connected together and supported by a plurality of substantially radially-extending, circumferentially-spaced stationary struts 174 (one shown in FIG. 1A). The stationary struts 174 may each be aerodynamically contoured to direct air flowing thereby. In some examples, other struts are provided in addition to the stationary struts 174 to connect and support the fan cowl 170 or core cowl 122. In many examples, the fan duct 172 and the core cowl 122 may at least partially co-extend (generally axially) on opposite sides (e.g., opposite radial sides) of the core cowl 122. For example, the fan duct 172 and the core cowl 122 may each extend directly from a leading edge 168 of the core cowl 122 and may partially co-extend generally axially on opposite radial sides of the core cowl 122.

The turbine engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 144 and the fan outlet guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or the leading edge 168 of the core cowl 122. The inlet duct 180 is wider than the core duct 142 along the radial direction R. The inlet duct 180 is also wider than the fan duct 172 along the radial direction R.

As previously discussed, debris (e.g., from bird strikes, rocks, and/or other particulate), also referred to as foreign object debris (FOD), can pass through the fan 144 during operation of the turbine engine 100, which can limit or block air flow to the core turbine engine 120. In some examples, one or more of the fan blades 146 can become damaged upon contact with debris. In some examples, a portion of the debris may be ingested into the core turbine engine 120 through the core inlet 124, which adversely affects engine performance and reliability, damages components of the turbine engine 100, and increases the frequency of repair and maintenance for the turbine engine 100. For example, debris that passes through the fan section 118*a* typically limits or blocks air flow at the engine inlet 182. Limited air flow to the LP compressor 126 or the HP compressor 128 adversely affects the performance of the turbine engine 100 because the compressors 126, 128 are taxed with exerting additional power to provide the sufficient amount of compressed air to the combustor 130. Typically, the LP compressor 126 and the HP compressor 128 compress air more efficiently when more air is provided to the LP compressor 126 and the HP compressor 128 (e.g., from the engine inlet 182).

While the fan blades 146 are designed to slice and move the debris radially outward, a risk of debris entering the core turbine engine 120 increases when the fan 144 is a low-speed fan, low blade count fan. For example, a reduced fan blade count provides fewer blades for slicing of debris. However, the splitter blades 148 are additional blades that increase a blade count of the fan 144 (e.g., near the hub 154). The splitter blades 148 perform debris slicing at lower span locations at which the fan blades 146 may not be able to slice the debris. In other words, the splitter blades 148 enable increased local slicing of debris near the hub 154. In particular, the increased blade count near the hub 154 provided by the splitter blades 148 enables more blades to contact debris and fling the debris radially outward (e.g., radially away from the fan cowl 170 and/or through the fan duct 172), removing a greater volume of debris from an intake flow. The splitter blades 148 thus allow the fan 144 to move more debris towards a bypass flowpath(s) and away from the core inlet 124, particularly at low span locations relative to fans without the splitter blades 148.

Thus, among other advantages, inclusion of the splitter blades 148 can mitigate damaging effects of debris hazards by providing additional blades to deflect, dislodge, divide, or otherwise expel debris from the fan section 118a. The splitter blades 148 also sever or cut debris into smaller pieces that are less likely to block air flow or cause damage. Accordingly, the splitter blades 148 improve efficiency of the fan 144 near the hub 154 to increase an overall compression ratio of the engine.

Figure 1B:
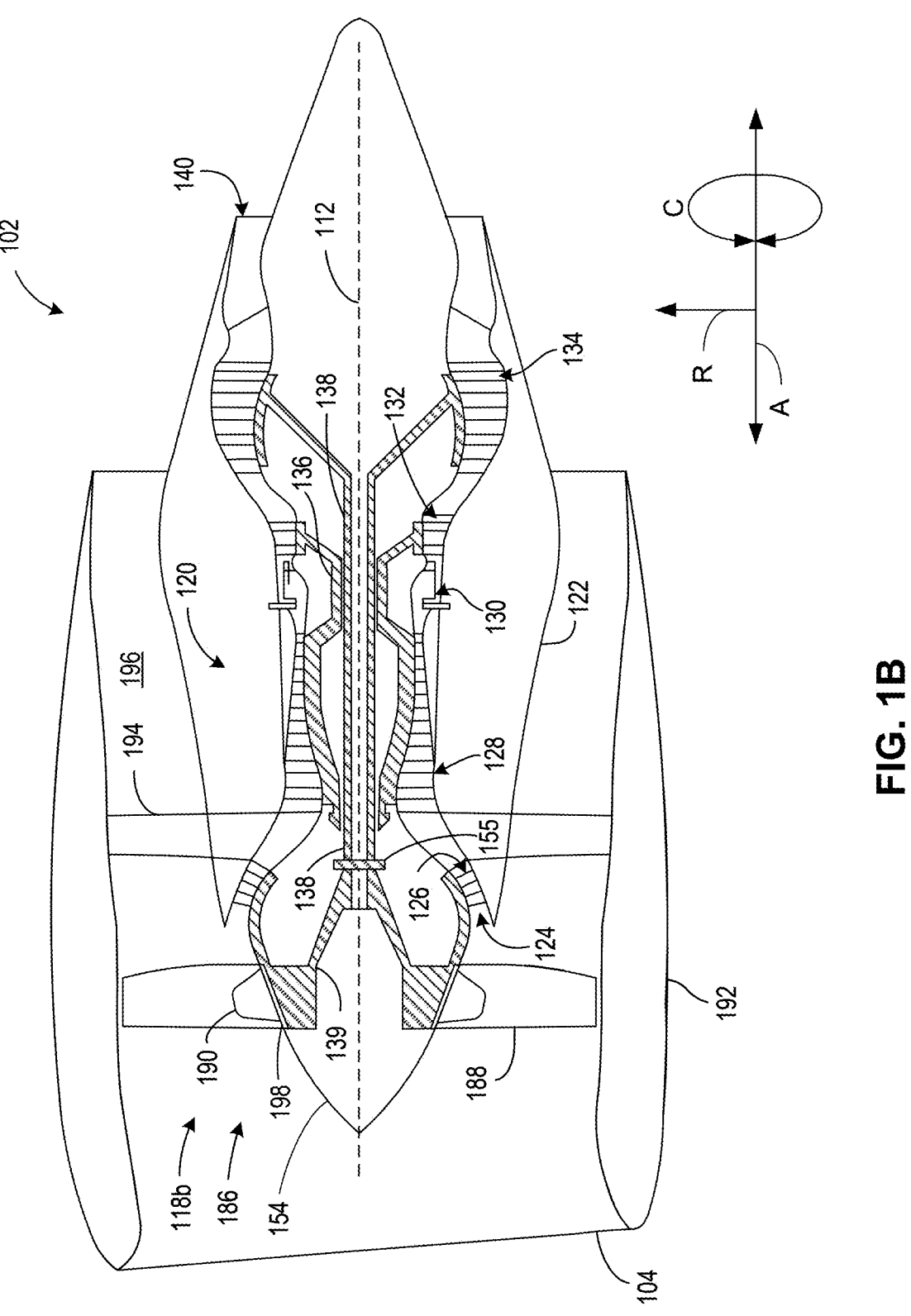
FIG. 1B is a schematic cross-sectional view of another example gas turbine engine in which the presently disclosed technology can be implemented.

In other examples, aspects of the present disclosure may be incorporated into another other gas turbine engine, such as propfan engines, turbojet engines, and/or turboshaft engines, as non-limiting examples. For example, referring to FIG. 1B, in example high-bypass turbofan-type gas turbine engine ("turbofan engine 102") is provided. In particular, FIG. 1B is a schematic cross-sectional view of the turbofan engine 102. As shown in FIG. 1B, the turbofan engine 102 defines a longitudinal or axial engine centerline (e.g., the engine centerline 112 of FIG. 1A) extending therethrough for reference. FIG. 1B also includes an annotated directional diagram with reference to the axial direction A, the radial direction R, and the circumferential direction C.

The turbofan engine 102 of FIG. 1B can be configured similar to the turbine engine 100 described above with reference to FIG. 1A. For example, the turbofan engine 102 includes a core turbine engine 120 disposed downstream from a fan section 118b. The core turbine engine 120 includes a core cowl 122 that defines an annular core inlet 124 and encloses, in serial flow relationship, a compressor section, a combustion section, a turbine section, and an exhaust section. In particular, the core cowl 122 encloses a LP compressor 126, a HP compressor 128, a combustor 130, a HP turbine 132, a LP turbine 134, and the core exhaust nozzle 140. Further, a HP shaft 136 drivingly couples the HP turbine 132 and the HP compressor 128 and a LP shaft 138 drivingly couples the LP turbine 134 and the LP compressor 126. The LP shaft 138 can also couple to a fan shaft 139 of the fan section 118b. For example, the LP shaft 138 can be directly coupled to the fan shaft 139 (e.g., in a direct-drive configuration) or via a speed reduction gearbox 155 (e.g., in an indirect-drive or geared-drive configuration).

However, for the turbofan engine 102 of FIG. 1B, the fan section 118b includes a fan 186, which is a primary fan in this example, configured as a ducted fan. Like the unducted fan 144 of FIG. 1A, the fan 186 of FIG. 1B includes an array of fan blades 188 (one shown in FIG. 1B) (e.g., first fan blades, primary fan blades, main fan blades, primary blades, full-span blades, etc.) and an array of splitter blades 190 (one shown in FIG. 1B) (e.g., second or secondary blades, partial-span blades etc.) (hereinafter referred to as "splitter blades 190"). Unlike the fan 144 of FIG. 1A, the fan 186 of FIG. 1B includes an annular fan casing or nacelle 192 that circumferentially encloses the fan section 118b and/or at least a portion of the core turbine engine 120. The nacelle 192 can be supported relative to the core turbine engine 120 by a plurality of circumferentially-spaced apart outlet guide vanes 194.

Further, the turbofan engine 102 is a fixed pitch gas turbine engine. In particular, the fan blades 188 of the fan

186 of FIG. 1B are not rotatable about a pitch axis. Each of the blades 188, 190 has a root, a tip, and a span defined therebetween. In FIG. 1B, each of the blades 188, 190 are coupled at their respective roots to a disk 198. For example, one or more of the blades 188, 190 can be coupled to the disk 198 via a respective spar, via a respective dovetails slot, and/or via another connection. In some examples, one or more of the blades 188, 190 can be integrally formed with the disk 198. The disk 198 is covered by a hub 154 (e.g., a spinner) that is aerodynamically contoured to promote airflow through the blades 188, 190. The blades 188, 190 extend radially away from the hub 154.

As illustrated in FIG. 1B, a downstream section of the nacelle 192 can enclose an outer portion of the core turbine engine 120 to define a bypass airflow passage 196 therebetween. During operation of the turbofan engine 102, air enters an inlet portion 104 of the turbofan engine 102. A first portion of the air flows into the bypass airflow passage 196, while a second portion of the air flows into the core inlet 124 of the LP compressor 126.

It is understood that the turbine engine 100 depicted in FIG. 1A is by way of example. In other examples, the number of compressors, turbines, shafts, or a combination thereof may vary. Furthermore, in some examples, one or more of the compressors (e.g., the LP compressor 126, the HP compressor 128, another compressor, or a combination thereof) can include one more splitter blades located circumferentially between blades of the one or more compressors. Along with unducted turbine engine 100 of FIG. 1A and ducted turbofan engine 102 of FIG. 1B, the core turbine engine 120 serves a similar purpose and is exposed to a similar environment in land-based gas turbines, turbojet engines, reverse flow engines, and turboprop engines.

Disclosed herein are example methods and apparatus that provide multiple fan blades on an example trunnion. In examples disclosed herein, the inclusion of additional fan blades on an example trunnion provides additional air flow to the compressor sections of an associated aircraft engine. For example, the additional fan blades disclosed herein help to compress the incoming airflow to a subsequent compressor section. In turn, this increased air flow liberates a compressor section from needlessly expending power to generate enough compressed air for a subsequent combustor. As such, disclosed examples aid or improve the performance of a compressor section. Further, disclosed examples can mitigate the damaging effects of FOD hazards to a fan section of an associated aircraft engine. For example, disclosed examples provide additional fan blades to deflect, dislodge, divide, or otherwise expel FOD from the fan section. In some examples, additional fan blades disclosed herein can sever or cut FOD into smaller pieces that are less likely to block air flow at an engine inlet. As such, disclosed examples can improve the performance of compressor section by mitigating air flow blockage due to FOD at the engine inlet.

Figure 2:
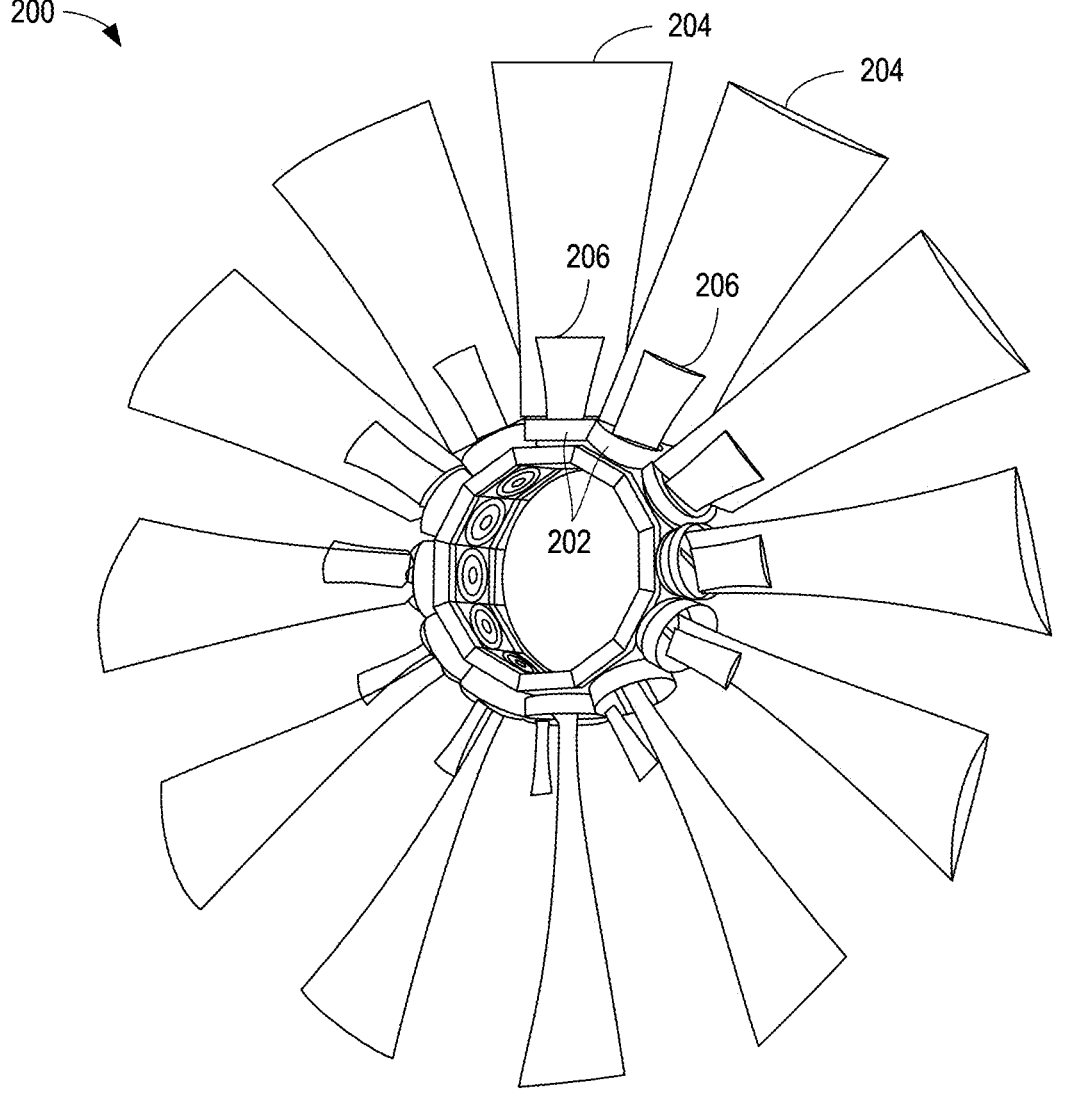
FIG. 2 is a portion of an example fan section constructed in accordance with teachings disclosed herein.

FIG. 2 is a portion of an example fan section 200 constructed in accordance with teachings disclosed herein. The example fan section 200 includes trunnions 202, first fan blades 204 (e.g., primary fan blades, main fan blades, etc.), and second fan blades 206 (e.g., secondary fan blades, splitter blades, additional fan blades, etc.). The fan section 200 of FIG. 2 is similar to the fan sections 118a, 118b of FIGS. 1A and 1B. However, in the fan section 200, each respective second fan blade 206 is coupled to a corresponding trunnion 202.

The trunnions 202 are rotatable within a hub (e.g., the hub 154 of FIGS. 1A and 1B) of an aircraft engine (e.g., the three-stream engine 100 of FIG. 1A, the turbofan engine 102 of FIG. 1B). The first fan blades 204 can extend radially away from an example hub. Further, the second fan blades 206 can extend radially away from an example hub. As shown in FIG. 2, each one of the trunnions 202 is coupled to one of the first fan blades 204 and one of the second fan blades 206. The first fan blades 204 include first bases that are coupled to respective ones of the trunnions 202. Further, the second fan blades 206 include second bases that are coupled to respective ones of the trunnions 202. In other words, the first fan blades 204 and the second fan blades 206 are mounted to or within respective ones of the trunnions 202. In some examples, each of the first and second fan blades 204, 206 extend at least partially through respective faces (e.g., surfaces, outer surfaces, etc.) of respective ones of the trunnions 202. As shown in FIG. 2, the second fan blades 206 are circumferentially offset from the first fan blades 204.

The second fan blades 206 have a different shape, size, position, etc., than the first fan blades 204. For example, the first fan blades 204 have a first camber and the second fan blades 206 have a second camber different from the first camber. As used herein, "camber" is a measure of the curvature or the convexity of the curve of the fan blades (e.g., the first fan blades or the second fan blades) from the leading edge to the trailing edge of the blades. In some examples, each of the second fan blades 206 are about 10 percent (%) (e.g., within +/−2%) the size of respective ones of the first fan blades 204. In some examples, each of the second fan blades 206 are between 10% to 25% the size of respective ones of the first fan blades 204.

The first fan blades 204 can include a polymer composite material (e.g., laminated plies, woven structures, thermoplastic material, etc.) or metal. The second fan blades 206 can include a polymer composite material or metal. In some examples, the first fan blades 204 and the second fan blades 206 include a same material. In some examples, the first fan blades 204 include a first material and the second fan blades 206 include a second material different from the first material. In some examples, any or all the first fan blades 204 include a leading edge protector. Similarly, in some examples, any or all of the second fan blades 206 include a leading edge protector.

In some examples, the first fans blade 204 and/or the second fan blade 206 is a composite construction fan blade (e.g., is formed of a composite material). As used herein, the phrase "formed of a composite material," with reference to a blade refers to at least 60% by weight of the blade, between a base of the blade and a tip of fan blade, being formed of one or more composite materials. Example composite materials include (but are not limited to) polymer matrix composites (PMC), ceramic matrix composites (CMC), chopped fiber composite materials. As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide (Al2O3), silicon dioxide (SiO2), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide (Al2O3), silicon dioxide (SiO2), aluminosilicates such as mullite, or mixtures thereof), or mixtures thereof.

Figure 3:
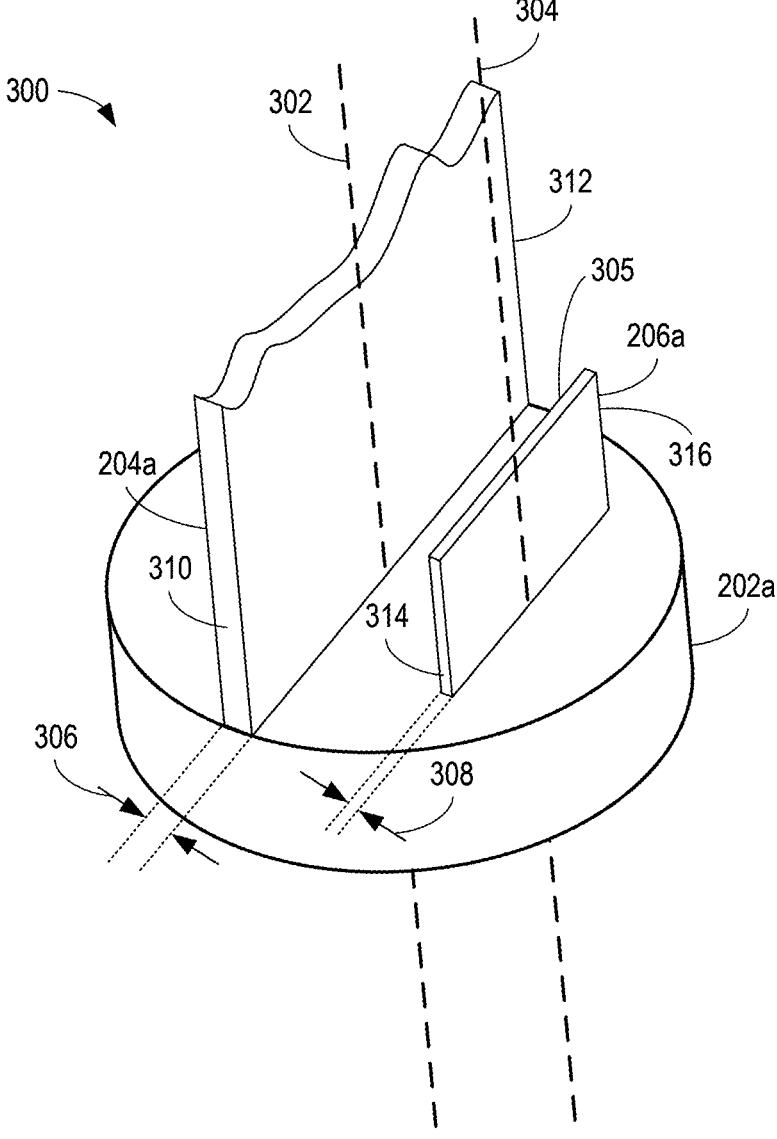
FIG. 3 is a schematic illustration of an example trunnion, first fan blade, and second fan blade of the fan section of FIG. 2.

FIG. 3 is a schematic illustration 300 of one of the trunnions 202 (e.g., trunnion 202a) coupled to one of the first fan blades 204 (e.g., first fan blade 204a) and one of the second fan blades 206 (e.g., second fan blade 206a). The examples described in connection with the schematic illustration 300 of FIG. 3 apply to any or all of the trunnions 202, the first fan blades 204, the second fan blades 206, etc., of FIG. 2.

The first fan blade 204a has an example pitch axis 302. The second fan blade 206a has a second longitudinal axis 304 that is laterally offset from the pitch axis 302. The second longitudinal axis 304 extends along a spanwise direction of the second fan blade 206a. Additionally or alternatively, the second fan blade 206a is spaced apart from (e.g., in a circumferential direction) the first fan blade 204a. Each of the first and second fan blades 204a, 206a are coupled to or include spars. For example, the first fan blade 204a includes a first spar (not shown in FIG. 3) positioned in an interior (e.g., within an airfoil) of the first fan blade 204a. The first spar extends along the pitch axis 302. Further, the second fan blade 206a includes a second spar (not shown in FIG. 3) positioned in an interior of the second fan blade 206a. The second spar extends along the second longitudinal axis 304. In some examples, the first and second spars include a same material. In some examples, the first spar includes a first material and the second spar includes a second material different from the first material. For example, the first material or the second material includes metal or a polymer composite.

The first fan blade 204a extends a first distance along the pitch axis 302. Further, the second fan blade 206a extends a second distance along the second longitudinal axis 304. The second fan blade 206a includes an example tip 305 that is distal from the trunnion 202a. As shown in FIG. 3, the second distance is less than the first distance. Put differently, the first and second fan blades 204a, 206a include different heights. The first fan blade 204a includes a first thickness 306 and the second fan blade 206a includes a second thickness 308, the second thickness 308 less than the first thickness 306. In the example of FIG. 3, the first fan blade 204a is substantially parallel (e.g., within +/−5 degrees) to the second fan blade 206a.

The first fan blade 204a includes a first chord length and the second fan blade includes a second chord length less than the first chord length. As used herein, the term "chord length" refers to a distance between a trailing edge of a fan blade and a leading edge of the fan blade. For example, a distance between a first leading edge 310 of the first fan blade 204a and a first trailing edge 312 of the first fan blade 204a can define the first chord length. Further, a distance between a second leading edge 314 of the second fan blade 206a and a second trailing edge 316 of the second fan blade 206a defines the second chord length. When the first chord length is at or proximate (e.g., adjacent) a tip of the first can blade 204a (e.g., the first chord length is a first maximum chord length), the first chord length is larger than the second chord length. Moreover, the first maximum chord length is larger than the second chord length when the second chord length is a maximum second chord length.

FIGS. 4A-4E are schematic, plan views of example assemblies constructed in accordance with teachings disclosed herein. FIG. 4A is an example first assembly 400 including a trunnion 402, a first fan blade 404, and a second fan blade 406. The first assembly 400 of FIG. 4A is similar to the schematic illustration 300 of FIG. 3. However, in the first assembly 400 of FIG. 4A, first and second leading edges 408, 410 of the first and second fan blades 404, 406, respectively, are aligned. For example, the first leading edge 408 of the first fan blade 404 is substantially coplanar (e.g., within +/−5 degrees) with the leading edge 410 of the second fan blade 406.

FIG. 4B is an example second assembly 412 including a trunnion 414, a first fan blade 416, and a second fan blade 418. The second assembly 412 of FIG. 4B is similar to the schematic illustration 300 of FIG. 3. For example, the second fan blade 418 has the second thickness of the second fan blade 206*a* of FIG. 3. However, the second assembly 412 of FIG. 4B includes an example third fan blade 420. The third fan blade 420 is coupled to the trunnion 414. In the example of FIG. 4B, the first fan blade 416 is positioned between the second fan blade 418 and the third fan blade 420. Put differently, the main fan blade 416 is flanked by secondary fan blades 418, 420.

In this example, the third fan blade 420 is similar to the second fan blade 206*a* (e.g., being a secondary fan blade having a different size than the first fan blade 204*a*). The third fan blade 420 of FIG. 4B includes a third thickness that is substantially the same (e.g., within +/−10 percent) as the second thickness 308 (FIG. 3). In other examples, the third thickness of the third fan blade 420 can be up to +/−35 percent of the second thickness. For example, stresses (e.g., thermal, mechanical, etc.) on the third fan blade 420 can be different from stresses on the second fan blade 418 based on whether a respective fan blade is on a pressure side of the main blade 416 or a suction side of the main blade 416.

The third fan blade 420 is laterally offset from the first fan blade 416. As such, the third fan blade 420 includes a pitch axis that is laterally offset from a pitch axis of the first fan blade 416 (e.g., the pitch axis 302). The third fan blade 420 is spaced apart from the first fan blade 416 by an example third distance 422 (e.g., in a first lateral direction). Further, the second fan blade 418 is spaced apart from the first fan blade 416 by an example fourth distance 424 (e.g., in the first lateral direction). In this example, the third distance 422 is substantially the same (e.g., within +/−1 centimeter (cm)) as the fourth distance 424. In other examples, the third distance 422 is different (e.g., within +/−7 cm) from the fourth distance 424 (e.g., based on a respective fan blade 418, 420 is on the pressure side of the main blade 416 or the suction side of the main blade 416).

Further, the second and third fan blades 418, 420 are laterally offset from the first fan blade 416 in a second lateral direction different from the first lateral direction. In this example, the second lateral direction is substantially perpendicular (e.g., within 5 degrees) to the first lateral direction. In some examples, the second lateral direction is positioned at an angle (e.g., 45 degrees, 60 degrees, etc.) relative to the first lateral direction. As shown in FIG. 4B, the second fan blade 418 is laterally offset from the first fan blade 416 by a fifth distance 426 (e.g., in the second lateral direction). Further, the third fan blade 420 is laterally offset from the first fan blade 416 by a sixth distance 428 (e.g., in the second lateral direction). In the example of FIG. 4B, the fifth distance 426 is different from (e.g., greater than) the sixth distance 428. In some examples, the fifth distance 426 is substantially the same (e.g., within +/−10 percent) as the sixth distance 428.

FIG. 4C is an example third assembly 430 including a trunnion 432, a first fan blade 434, a second fan blade 436, and a third fan blade 438. The third assembly 430 of FIG. 4C is similar to the second assembly 412 of FIG. 4B. However, in the third assembly 430 of FIG. 4C, the second fan blade 436 is angularly offset relative to the first fan blade 434. In some examples, the second fan blade 436 is angularly offset relative to the third fan blade 438. In some examples, the third fan blade 438 is angularly offset relative to the first fan blade 434.

FIG. 4D is an example fourth assembly 440 including a trunnion 442, a first fan blade 444, a second fan blade 446, and a third fan blade 448. The fourth assembly 440 of FIG. 4D is similar to the second assembly 412 of FIG. 4B. However, in the fourth assembly 440 of FIG. 4D, the third fan blade 448 includes a chord length that is shorter/less than a chord length of the second fan blade 446 (e.g., the second chord length of the second fan blade 206*a*).

FIG. 4E is an example fifth assembly 450 including a trunnion 452, a first fan blade 454, a second fan blade 456, and a third fan blade 458. The fifth assembly 450 of FIG. 4E is similar to the second assembly 412 of FIG. 4B. However, the fifth assembly 450 of FIG. 4E includes a fourth fan blade 460 laterally offset from the first fan blade 454. In this example, the fourth fan blade 460 is similar to the second fan blade 456 or the third fan blade 458. For example, the fourth fan blade 460 includes a fourth thickness that is substantially the same (e.g., within +/−10 percent) as a thickness of the second fan blade 456 (e.g., the second thickness 308 (FIG. 3) of the second fan blade 206*a*) or a thickness of the third fan blade 458 (e.g., the third thickness of the third fan blade 420). Further, the third fan blade 458 is positioned between the fourth fan blade 460 and the first fan blade 454. In some examples, the fourth fan blade 460 is adjacent to the second fan blade 456. In some examples, the second fan blade 456 is positioned between the first fan blade 454 and the fourth fan blade 460.

In some examples, the fan section 200, the first assembly 400, the second assembly 412, the third assembly 430, the fourth assembly 440, or the fifth assembly 450 is included in means for providing thrust. For example, the means for providing thrust may be implemented by the three-stream engine 100 of FIG. 1A, the turbofan engine 102 of FIG. 1B, etc.

In some examples, the fan section 200 includes means for covering. For example, the means for covering may be implemented by the hub 154 of FIGS. 1A and 1B.

In some examples, the fan section 200 includes means for rotating. For example, the means for rotating may be implemented by any of the trunnions 202*a*, 402, 414, 432, 442, 452 of FIGS. 3, 4A, 4B, 4C, 4D, 4E.

In some examples, the fan section 200 includes first means for pushing air. For example, the first means for pushing air may be implemented by any of the first fan blades 204*a*, 404, 416, 434, 444, 454 of FIGS. 3, 4A, 4B, 4C, 4D, 4E.

In some examples, the fan section 200 includes second means for pushing air. For example, the second means for pushing air may be implemented by any of the second fan blades 206*a*, 406, 418, 436, 436, 446, 456 of FIGS. 3, 4A, 4B, 4C, 4D, 4E.

In some examples, the first fan blades 204*a*, 404, 416, 434, 444, 454 or the second fan blades 206*a*, 406, 418, 436, 436, 446, 456 include a second means for covering. For example, the second means for covering may be implemented by a leading edge protector.

In some examples, the first fan blades 204a, 404, 416, 434, 444, 454 include a first means for supporting. For example, the first means for supporting may be implemented by a first spar.

In some examples, the second fan blades 206a, 406, 418, 436, 436, 446, 456 include a second means for supporting. For example, the second means for supporting may be implemented by a second spar.

In some examples, the first fan blades 204a, 404, 416, 434, 444, 454 include a first means for bounding. For example, the first means for bounding may be implemented by the first leading edge 310 or the first leading edge 408 of FIGS. 3 and 4A.

In some examples, the first fan blades 204a, 404, 416, 434, 444, 454 include a second means for bounding. For example, the second means for bounding may be implemented by the first trailing edge 312 of FIG. 3.

In some examples, the second fan blades 206a, 406, 418, 436, 436, 446, 456 include a third means for bounding. For example, the third means for bounding may be implemented by the second leading edge 314 or the second leading edge 410 of FIGS. 3 and 4A.

In some examples, the second fan blades 206a, 406, 418, 436, 436, 446, 456 include a fourth means for bounding. For example, the fourth means for bounding may be implemented by the second trailing edge 316 of FIG. 3.

In some examples, the fan section 200 includes third means for pushing air. For example, the third means for pushing air may be implemented by any of the third fan blades 420, 438, 448, 458 of FIGS. 4B, 4C, 4D, 4E.

In some examples, the trunnions 202a, 402, 414, 432, 442, 452 include means for receiving. For example, the means for receiving may be implemented by a face, a surface, etc., of the trunnions 202a, 402, 414, 432, 442, 452 of FIGS. 3, 4A, 4B, 4C, 4D, 4E.

In some examples, the first fan blades 204a, 404, 416, 434, 444, 454 include a first means for mounting. For example, the first means for mounting may be implemented by any of first bases of the first fan blades 204a, 404, 416, 434, 444, 454 of FIGS. 3, 4A, 4B, 4C, 4D, 4E.

In some examples, the second fan blades 206a, 406, 418, 436, 436, 446, 456 include a second means for mounting. For example, the second means for mounting may be implemented by any of second bases of the second fan blades 206a, 406, 418, 436, 436, 446, 456 of FIGS. 3, 4A, 4B, 4C, 4D, 4E.

From the foregoing, it will be appreciated that example systems, apparatus, articles of manufacture, and methods have been disclosed that provide multiple fan blades on an example trunnion. In examples disclosed herein, the inclusion of additional fan blades on an example trunnion provides additional air flow to the compressor sections of an associated aircraft engine. For example, the additional fan blades disclosed herein help to compress the incoming airflow to a subsequent compressor section. In turn, this increased air flow liberates a compressor section from needlessly expending power to generate enough compressed air for a subsequent combustor. As such, disclosed examples aid or improve the performance of a compressor section. Further, disclosed examples can mitigate the damaging effects of FOD hazards to a fan section of an associated aircraft engine. For example, additional fan blades deflect, dislodge, divide, or otherwise expel FOD from the fan section. In some examples, additional fan blades disclosed herein sever or cut FOD into smaller pieces that are less likely to block air flow at an engine inlet. As such, disclosed examples improve the performance of compressor section by mitigating air flow blockage due to FOD at the engine inlet.

Further disclosure is provided by the following clauses:

An example apparatus includes a trunnion rotatable within a hub of an aircraft engine, a first fan blade coupled to the trunnion, the first fan blade having a pitch axis, and a second fan blade coupled to the trunnion, the second fan blade having a longitudinal axis, the longitudinal axis laterally offset from the pitch axis.

An example apparatus includes a trunnion rotatably mounted within a hub of an aircraft engine; a first fan blade coupled to the trunnion, the first fan blade having a pitch axis; and a second fan blade coupled to the trunnion, the second fan blade having a longitudinal axis, the longitudinal axis laterally offset from the pitch axis.

The apparatus of any preceding clause, wherein the first fan blade includes a first maximum chord length and the second fan blade includes a second maximum chord length less than the first maximum chord length.

The apparatus of any preceding clause, wherein the second fan blade is angularly offset relative to the first fan blade.

The apparatus of any preceding clause, wherein the first fan blade spans a first distance along the pitch axis and the second fan blade spans a second distance along the longitudinal axis, the second distance less than the first distance.

The apparatus of any preceding clause, wherein the first fan blade includes a first thickness and the second fan blade includes a second thickness, the second thickness less than the first thickness.

The apparatus of any preceding clause, wherein at least one of the first fan blade or the second fan blade includes a leading edge protector.

The apparatus of any preceding clause, wherein the first fan blade includes a first spar positioned in an interior of the first fan blade and the second fan blade includes a second spar positioned in an interior of the second fan blade, the first spar extending along the pitch axis, the second spar extending along the longitudinal axis, the first spar including a first material, the second spar including a second material different from the first material.

The apparatus of any preceding clause, wherein the first fan blade includes a first leading edge and a first trailing edge and the second fan blade includes a second leading edge and a second trailing edge, the second leading edge aligned with the first leading edge.

The apparatus of any preceding clause, wherein the first fan blade includes a first material and the second fan blade includes a second material different from the first material.

The apparatus of any preceding clause, wherein at least one of the first material or the second material includes metal.

The apparatus of any preceding clause, wherein at least one of the first material or the second material includes a thermoplastic material.

The apparatus of any preceding clause, further including a third fan blade coupled to the trunnion, the third fan blade having a third pitch axis laterally offset from the pitch axis.

The apparatus of any preceding clause, wherein the first fan blade is positioned between the second fan blade and the third fan blade.

The apparatus of any preceding clause, wherein the third fan blade is spaced apart from the first fan blade by a first distance and the second fan blade is spaced apart from the first fan blade by a second distance, the second distance greater than the first distance.

An example aircraft engine includes a rotatable trunnion, a first fan blade mounted to the rotatable trunnion, and a second fan blade mounted to the rotatable trunnion, the second fan blade spaced apart from the first fan blade.

The aircraft engine of any preceding clause, wherein the first fan blade extends at least partially through a face of the rotatable trunnion and the second fan blade extends at least partially through the face of the rotatable trunnion.

The aircraft engine of any preceding clause, wherein the first fan blade includes a first thickness and the second fan blade includes a second thickness, the second thickness less than the first thickness.

The aircraft engine of any preceding clause, further including a third fan blade mounted to the rotatable trunnion, the third fan blade having a third thickness, the third thickness substantially the same as the second thickness.

The aircraft engine of any preceding clause, wherein the third fan blade is positioned between the first fan blade and the second fan blade.

An example aircraft engine includes a hub, a trunnion rotatably coupled to the hub, a first fan blade extending radially away from the hub, the first fan blade having a first base coupled to the trunnion, and a second fan blade extending radially away from the hub, the second fan blade having a second base coupled to the trunnion.

An example apparatus includes a means for rotating rotatable within a first means for covering of a means for providing thrust, a first means for pushing air coupled to the means for rotating, the first means for pushing air having a pitch axis, and a second means for pushing air coupled to the means for rotating, the second means for pushing air having a longitudinal axis, the longitudinal axis laterally offset from the pitch axis.

The apparatus of any preceding clause, wherein the first means for pushing air includes a first chord length and the second means for pushing air includes a second chord length less than the first chord length.

The apparatus of any preceding clause, wherein the second means for pushing air is angularly offset relative to the first means for pushing air.

The apparatus of any preceding clause, wherein the first means for pushing air spans a first distance along the pitch axis and the second means for pushing air spans a second distance along the longitudinal axis, the second distance less than the first distance.

The apparatus of any preceding clause, wherein the first means for pushing air includes a first thickness and the second means for pushing air includes a second thickness, the second thickness less than the first thickness.

The apparatus of any preceding clause, wherein the second means for pushing air includes second means for covering.

The apparatus of any preceding clause, wherein the first means for pushing air includes a first means for supporting positioned in an interior of the first means for pushing air and the second means for pushing air includes a second means for supporting positioned in an interior of the second means for pushing air, the first means for supporting extending along the pitch axis, the second means for supporting extending along the longitudinal axis, the first means for supporting including a first material, the second means for supporting including a second material different from the first material.

The apparatus of any preceding clause, wherein the first means for pushing air includes a first means for bounding and a second means for bounding and the second means for pushing air includes a third means for bounding and a fourth means for bounding, the third means for bounding aligned with the first means for bounding.

The apparatus of any preceding clause, wherein the first means for pushing air includes a first material and the second means for pushing air includes a second material different from the first material.

The apparatus of any preceding clause, wherein at least one of the first material or the second material includes metal.

The apparatus of any preceding clause, wherein at least one of the first material or the second material includes a thermoplastic material.

The apparatus of any preceding clause, further including a third means for pushing air coupled to the means for rotating, the third means for pushing air having a third pitch axis laterally offset from the pitch axis.

The apparatus of any preceding clause, wherein the third means for pushing air is positioned between the first means for pushing air and the second means for pushing air.

The apparatus of any preceding clause, wherein the first means for pushing air is positioned between the second means for pushing air and the third means for pushing air.

The apparatus of any preceding clause, wherein the third means for pushing air is spaced apart from the first means for pushing air by a first distance and the second means for pushing air is spaced apart from the first means for pushing air by a second distance, the second distance greater than the first distance.

The apparatus of any preceding clause, wherein the first means for pushing air extends at least partially through a means for receiving of the means for rotating and the second means for pushing air extends at least partially through the means for receiving of the means for rotating.

The apparatus of any preceding clause, wherein the first means for pushing air includes a first means for mounting coupled to the means for rotating and the second means for pushing air includes a second means for mounting coupled to the means for rotating.

An example apparatus includes a trunnion rotatable within a hub of an aircraft engine, a first fan blade coupled to the trunnion, the first fan blade having a pitch axis, and a second fan blade coupled to the trunnion, the second fan blade circumferentially offset from the first fan blade, the second fan blade having a tip distal from the trunnion.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   a trunnion rotatably mounted within a hub of an aircraft engine, the trunnion having a pitch axis;
   a first fan blade coupled to the trunnion, the first fan blade aligned with the pitch axis of the trunnion;
   a second fan blade coupled to the trunnion, the second fan blade circumferentially offset from the first fan blade and having a longitudinal axis, the longitudinal axis laterally offset from the pitch axis; and
   a third fan blade coupled to the trunnion, the third fan blade having a third pitch axis laterally offset from the pitch axis, wherein the first fan blade is positioned between the second fan blade and the third fan blade, the first fan blade and the second fan blade rotatable with the trunnion with respect to a centerline of the aircraft engine.

2. The apparatus of claim 1, wherein the first fan blade includes a first maximum chord length and the second fan blade includes a second maximum chord length less than the first maximum chord length.

3. The apparatus of claim 1, wherein the second fan blade is angularly offset relative to the first fan blade.

4. The apparatus of claim 1, wherein the first fan blade spans a first distance along the pitch axis and the second fan blade spans a second distance along the longitudinal axis, the second distance less than the first distance.

5. The apparatus of claim 1, wherein the first fan blade includes a first thickness and the second fan blade includes a second thickness, the second thickness less than the first thickness.

6. The apparatus of claim 1, wherein at least one of the first fan blade or the second fan blade includes a leading edge protector.

7. The apparatus of claim 1, wherein the first fan blade includes a first spar positioned in an interior of the first fan blade and the second fan blade includes a second spar positioned in an interior of the second fan blade, the first spar extending along the pitch axis, the second spar extending along the longitudinal axis, the first spar including a first material, the second spar including a second material different from the first material.

8. The apparatus of claim 1, wherein the first fan blade includes a first leading edge and a first trailing edge and the second fan blade includes a second leading edge and a second trailing edge, the second leading edge aligned with the first leading edge.

9. The apparatus of claim 1, wherein the first fan blade includes a first material and the second fan blade includes a second material different from the first material.

10. The apparatus of claim 9, wherein at least one of the first material or the second material includes metal.

11. The apparatus of claim 9, wherein at least one of the first material or the second material includes a thermoplastic material.

12. The apparatus of claim 1, wherein the third fan blade is spaced apart from the first fan blade by a first distance and the second fan blade is spaced apart from the first fan blade by a second distance, the second distance greater than the first distance.

13. An aircraft engine comprising:

a rotatable trunnion having a pitch axis;

a first fan blade mounted to the rotatable trunnion, the first fan blade aligned with the pitch axis of the trunnion;

a second fan blade mounted to the rotatable trunnion, the second fan blade circumferentially offset from the first fan blade and having a longitudinal axis, the longitudinal axis laterally offset from the pitch axis; and a third fan blade mounted to the rotatable trunnion, the third fan blade having a third pitch axis laterally offset from the pitch axis, wherein the first fan blade is positioned between the second fan blade and the third fan blade, the first fan blade and the second fan blade rotatable with the rotatable trunnion with respect to a centerline of the aircraft engine.

14. The aircraft engine of claim 13, wherein the first fan blade extends at least partially through a face of the rotatable trunnion and the second fan blade extends at least partially through the face of the rotatable trunnion.

15. The aircraft engine of claim 13, wherein the first fan blade includes a first thickness and the second fan blade includes a second thickness, the second thickness less than the first thickness.

16. The aircraft engine of claim 15, wherein the third fan blade has a third thickness, the third thickness substantially the same as the second thickness.

17. An aircraft engine comprising:

a hub;

a trunnion rotatably coupled to the hub, the trunnion having a pitch axis;

a first fan blade extending radially away from the hub, the first fan blade having a first base coupled to the trunnion, the first fan blade aligned with the pitch axis of the trunnion;

a second fan blade extending radially away from the hub, the second fan blade having a second base coupled to the trunnion, the second fan blade circumferentially offset from the first fan blade and having a longitudinal axis, the longitudinal axis laterally offset from the pitch axis; and a third fan blade coupled to the trunnion, the third fan blade having a third pitch axis laterally offset from the pitch axis, wherein the first fan blade is positioned between the second fan blade and the third fan blade, the first fan blade and the second fan blade rotatable with the trunnion with respect to a centerline of the aircraft engine.

\* \* \* \* \*